(12) United States Patent
Sakamaki

(10) Patent No.: US 9,560,286 B2
(45) Date of Patent: Jan. 31, 2017

(54) IMAGE CAPTURING APPARATUS AND METHOD FOR CONTROLLING THE SAME

(71) Applicant: CANON KABUSHIKI KAISHA, Tokyo (JP)

(72) Inventor: Takuya Sakamaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 14/697,348

(22) Filed: Apr. 27, 2015

(65) Prior Publication Data

US 2015/0312462 A1 Oct. 29, 2015

(30) Foreign Application Priority Data

Apr. 28, 2014 (JP) .................. 2014-093088

(51) Int. Cl.
*H04N 5/235* (2006.01)
*H04N 5/232* (2006.01)

(52) U.S. Cl.
CPC .......... *H04N 5/2354* (2013.01); *H04N 5/2353* (2013.01); *H04N 5/23212* (2013.01); *H04N 5/23241* (2013.01); *H04N 5/23245* (2013.01)

(58) Field of Classification Search
CPC .................................. H04N 5/2354
USPC ....................................... 348/370
See application file for complete search history.

(56) References Cited

U.S. PATENT DOCUMENTS

| | | | | |
|---|---|---|---|---|
| 6,281,991 B1* | 8/2001 | Mori | .................. | H04N 1/40056 358/471 |
| 8,326,141 B1* | 12/2012 | Clark | .................... | G03B 15/03 396/198 |
| 2004/0201731 A1* | 10/2004 | Kakinuma | ............. | H04N 5/235 348/229.1 |
| 2007/0132404 A1* | 6/2007 | Tamegai | ................ | H05B 41/32 315/291 |
| 2015/0262024 A1* | 9/2015 | Braithwaite | ....... | G06K 9/00255 382/118 |
| 2015/0277588 A1* | 10/2015 | Pang | .................. | G06F 3/03543 345/166 |
| 2015/0281622 A1* | 10/2015 | Fujihashi | ................ | H04N 5/04 348/294 |

FOREIGN PATENT DOCUMENTS

JP 63-172137 A 7/1988

* cited by examiner

*Primary Examiner* — Roberto Velez
*Assistant Examiner* — Cynthia Segura
(74) *Attorney, Agent, or Firm* — Canon USA, Inc., IP Division

(57) ABSTRACT

An image capturing apparatus capturing an object image based on a set time includes: a first state-changing unit setting an light emission unit in a first state with a light emission corresponding to image capturing, and in a second state with less power consumption than that in the first state; a second state-changing unit setting the apparatus to a third state where an image is captured, and in a fourth state with less power consumption than that in the third state; and a light emission determining unit that determines whether to cause the emission unit to emit a light for the next capturing. The second state remains until the next capture when it is determined not to emit a light. The change to the fourth state starts after it is determined not to emit a light. Then, the apparatus changes to the third state again for the next capturing.

18 Claims, 7 Drawing Sheets

IMAGE CAPTURING APPARATUS AND METHOD FOR CONTROLLING THE SAME

BACKGROUND OF THE INVENTION

Field of the Invention

The present invention relates to an image capturing apparatus that can capture an image of an object at a set time, and a method for controlling the image capturing apparatus.

Description of the Related Art

There are image capturing apparatuses, such as digital cameras, that capture an image of an object at a set time. One of the image capturing apparatuses is a digital camera capable of interval image sensing in which the digital camera captures images of an object sequentially at set time intervals. Japanese Patent Application Laid-Open No. 63-172137 discloses a control device that curbs the energy consumption during interval sensing with the light emission of the strobe apparatus by controlling the power supply to the strobe apparatus based on the charging time of the strobe apparatus.

SUMMARY OF THE INVENTION

According to an aspect of the claimed invention, an image capturing apparatus that includes an image capturing unit and captures an image of an object based on a set time includes: a first state-changing unit that can change a state of an light emission unit to a first state in which the light emission unit emits a light corresponding to the image capturing unit capturing an image of an object, and to a second state in which electric power consumption decreases in comparison with consumption in the first state; a second state-changing unit configured to change an operation state of the image capturing apparatus to a third state in which the image capturing unit captures an image of an object, and to a fourth state in which electric power consumption decreases in comparison with consumption in the third state; and a light emission determining unit configured to determine whether to cause the light emission unit to emit a light for next image capture with the image capturing unit. The first state-changing unit maintains the state of the light emission unit in the second state until next image capture when the state of the light emission unit is in the second state and the light emission determining unit determines not to cause the light emission unit to emit a light. The second state-changing unit starts an operation for changing the operation state of the image capturing apparatus from the third state to the fourth state after a determination with the light emission determining unit when the operation state of the image capturing apparatus is in the third state and the light emission determining unit determines not to cause the light emission unit to emit a light, and then the second state-changing unit starts an operation for changing the operation state of the image capturing apparatus from the fourth state to the third state for next image capture.

The claimed invention can curb the electric power consumption in an image capturing apparatus when the image capturing apparatus captures an image of an object at a set time.

Further features of the present invention will become apparent from the following description of exemplary embodiments (with reference to the attached drawings).

DESCRIPTION OF THE EMBODIMENTS

First Embodiment

Figure 1:
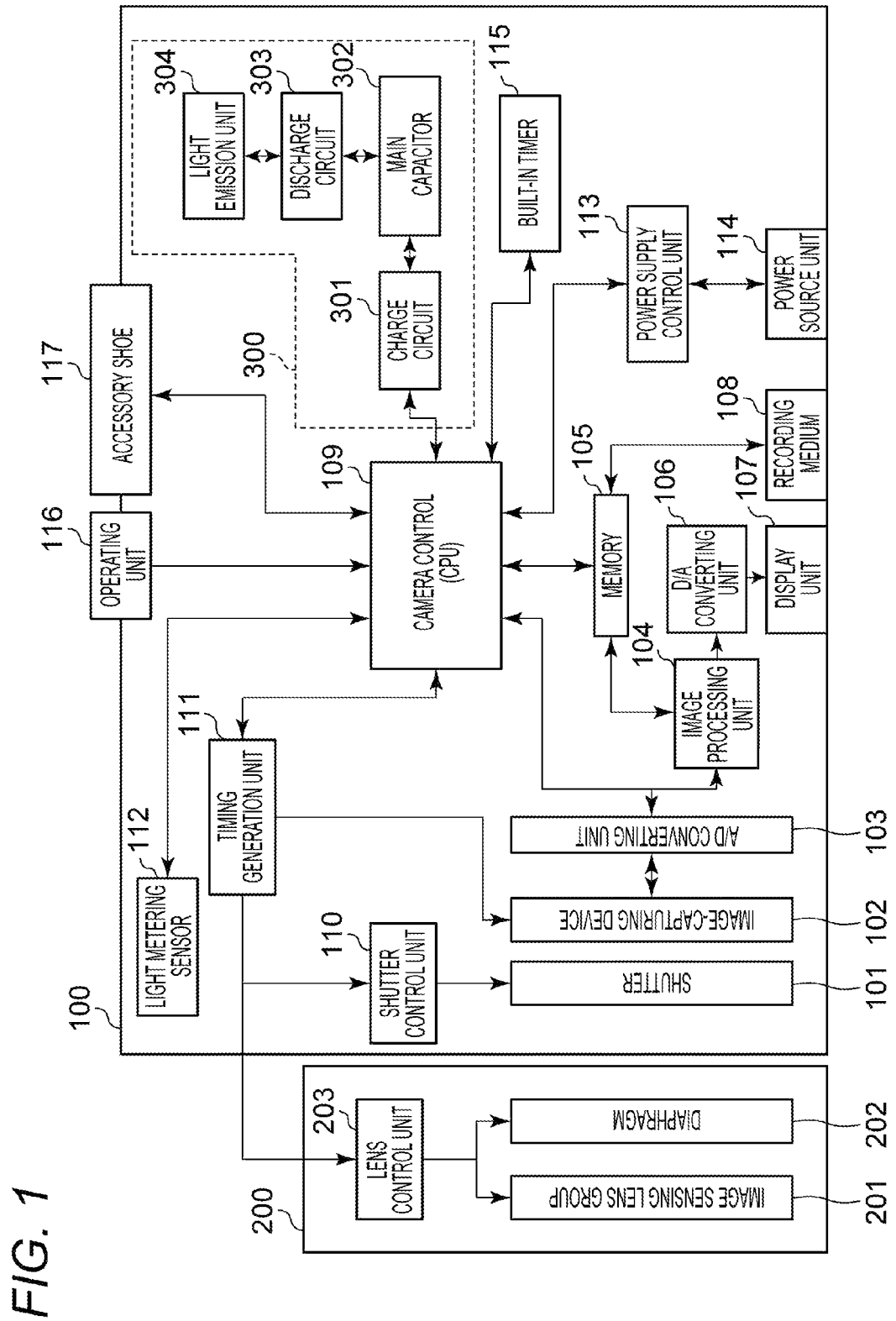
FIG. 1 is a block diagram of the configuration of a digital camera 100 that is a first embodiment of the image capturing apparatus according to the present invention.

A digital camera (hereinafter, referred to merely as a camera) 100 that is the image capturing apparatus of a first embodiment according to the present invention will be described with reference to FIGS. 1 to 4. FIG. 1 is a block diagram of the configuration of the camera 100 that is the first embodiment of the image capturing apparatus according the present invention.

A lens unit 200 is removably attached to the camera 100 through a lens mount. In other words, the camera 100 is a lens-interchangeable digital camera. Note that, needless to say, the lens unit 200 may be provided at the inside of the camera 100.

The image sensing lens group 201 includes a plurality of lenses including an optical axis shift lens, a zoom lens, and a focus lens. The diaphragm 202 is a light amount adjustment member to adjust the amount of light that has passed through the inside of the image sensing lens group 201.

The lens control unit 203 is configured to control the drive of the image sensing lens group 201 and the diaphragm 202. The lens control unit 203 controls the drive of the image sensing lens group 201 and the diaphragm 202 in response to the instructions from a camera control unit (hereinafter, referred to as a CPU) 109 to be described below. The lens control unit 203 controls the drive of the image sensing lens group 201 to position each of the lenses in focus on the object, or controls the drive of the diaphragm 202 to change the aperture diameter. The lens unit 200 of the present embodiment includes the image sensing lens group 201, diaphragm 202, and lens control unit 203 described above.

The camera 100 is provided with a shutter 101, and an image-capturing device 102. The shutter 101 is a blocking member to switch the state of the image-capturing device 102 between an exposure state and a non-exposure state. When the shutter 101 opens, the optical image of the object guided with the lens unit 200 is created on the image-capturing device 102. On the other hand, when the shutter 101 closes, the shutter 101 blocks the optical image of the object guided with the lens unit 200.

A shutter control unit 110 is configured to control the drive of the shutter 101. The shutter control unit 110 controls the drive of the shutter 101 in response to the instructions from the CPU 109 to be described below.

The shutter control unit 110 can control the exposure period (accumulation period) in which the optical image of the object is exposed on the image-capturing device 102 by controlling the drive of the shutter 101. Note that, although the present embodiment controls the exposure period by controlling the operation of the shutter 101, the present embodiment can control the accumulation period of electric charge (exposure period) in the image-capturing device 102 by using an electronic shutter method.

The image-capturing device 102 is a charge accumulation image-capturing device including a solid image-capturing device, such as a CCD and a CMOS, that can generate an image data by accumulating electric charge. The pixels for capturing an image are arranged two-dimensionally in the image-capturing device. When the optical image of the object is created on the image-capturing device 102, an analog electric signal (analog image data) in accordance with the optical image of the object is output to an A/D converting unit 103.

An Analog Front End (AFE) (not illustrated) is connected to the image-capturing device 102. The AFE adjusts the gain of the analog image data output from the image-capturing device 102 and perform the sampling in response to the instructions from the CPU 109 to be described below.

Note that, although the camera 100 of the present embodiment includes the combination of the image-capturing device 102 and the AFE as an image capturing unit, the image capturing unit is not limited to the present embodiment. The camera 100 may include all of the components that operate to capture an image of the object as the image capturing unit. Alternatively, the camera 100 may include an image-capturing device 102 as the image capturing unit.

The A/D converting unit 103 is configured to transform the analog image data output from the image-capturing device 102 into digital image data.

A timing generation unit 111 sets the timing to supply various signals to each component included in the camera 100 and strobe 300. The timing generation unit 111 sets the timing to supply, for example, a clock signal or a control signal to each component included in the camera 100 or the lens unit 200.

An image processing unit 104 is configured to perform a resizing process including a predetermined pixel interpolation and size reduction, a color converting process, a light metering operation, and an operation for ranging control of the digital image data output from the A/D converting unit 103. The image processing unit 104 can perform an Automatic White Balance (AWB) in a Through the Lens (TTL) method, an Autofocus (AF) process, and an Auto Exposure (AE) process. The image processing unit 104 further adjusts the gain of the digital image data.

A memory 105 can electrically delete and store the data. The memory 105 is, for example, EEPROM typified by a flash memory. The memory 105 stores various types of data used in the present embodiment. For example, the information about the programs executed in the camera 100, the constant for the operation, various conditions for the exposure, calculation expressions used in the processes in the camera 100, and types of the strobe 300 are stored in the memory 105 in advance.

Note that the programs executed in the camera 100 are for giving instructions for the operations similar to the operations in a flowchart illustrated in FIG. 2 and described below.

The memory 105 includes a recording area including a recording element such as DRAM for recording the image data. The memory 105 has a storage capacity large enough to be able to record a predetermined number of still images, or a movie and voice data for a predetermined period. The memory 105 can record the acquired digital image data.

The memory 105 is further used as a memory for displaying an image (a video memory), a work area of the CPU 109, and a buffer for recording a recording medium 108 to be described below. The digital image data that have been processed with various processes in the image processing unit 104 are temporarily recorded in the recording buffer. Subsequently, the digital image data are read with the CPU 109, and are recorded in the recording medium 108 after being transformed into the recordable image data.

The recording medium 108 is a recording medium, such as a memory card, or a hard disk, in which the digital image data recorded in the memory 105 may be recorded. In the present embodiment, the recording medium 108 may be inserted into and extracted from the inside of the body of the camera 100 while a lid (not illustrated) opens. The lid is provided at the exterior of the camera 100 while the lid can open and close. Then, the recording medium 108 can communicate with the CPU 109 while being inserted in the inside of the body of the camera 100. Note that the recording medium 108 is not limited, for example, to a memory card that can be inserted into and extracted from the camera 100, and the recording medium 108 may be an optical disk such as a DVD-RW disk, or a magnetic disk such as a hard disk. The recording medium 108 is not necessarily removable and may be embedded in the camera 100 in advance.

AD/A converting unit 106 is configured to transform the digital image data output from the image processing unit 104 into analog image data for display. A display unit 107 includes, for example, an LCD for displaying the analog image data that have been transformed with the D/A converting unit 106. The present embodiment can display the live view display of the image data of the captured image of the object by sequentially displaying the analog image data for display on the display unit 107. Note that the analog image data for display may be displayed not only on the display unit 107 but also on an electronic viewfinder (not illustrated).

The CPU 109 is a control unit configured to generally control the overall operation of the camera 100 and the lens unit 200. For example, the CPU 109 gives the instructions for controlling various operations and processes to the image processing unit 104, the memory 105, the shutter control unit 110, the timing generation unit 111, a power supply control unit 113, and the lens control unit 203. In the present embodiment, the CPU 109 adjusts the gain of the analog image data and the digital image data or sets the exposure period or aperture value to capture an image of the object. The CPU 109 can further give the instructions for controlling the operations or processes performed in the strobe 300 to the components included in the strobe 300. Note that the CPU 109 can also control the operations or processes in the camera 100 or the lens unit 200 in accordance with the programs stored in the memory 105 by executing the programs.

A built-in timer 115, which is a time measuring unit that can measure time, can measure the time related to each operation or process in the camera 100. For example, when the camera 100 is in the interval image sensing mode (the first mode), the built-in timer 115 measures, for example, the time interval (interval) T_int set for capturing an image of the object several times. In other words, the built-in timer 115 can measure the period between image capture and the next image capture with the camera 100.

Note that, even if the operation state of the camera 100 is in a power saving state to be described below, the built-in timer 115 can continuously operate. In other words, the built-in timer 115 of the present embodiment can measure the period described above regardless of the operation state, for example, of the CPU 109.

The interval image sensing mode described above is an image sensing mode in which images of the object are sequentially captured based on predetermined time intervals. When the camera 100 is set in the interval image sensing mode described above, the interval T_int indicates the time interval from the start of image capture of the object to the start of the next image capture. The image sensing mode that can be set in the camera 100 of the present embodiment will be described below.

A power source unit 114, which is a primary battery such as an alkaline battery or a lithium battery, a secondary battery such as an NiCd battery, an NiMH battery, or an Li battery, or an AC adapter, supplies electric power to the power supply control unit 113. The power supply control unit 113 includes a DC-DC converter, and a switch circuit that switches an energization block. The power supply control unit 113 is configured to control the supply of electric power to each component in the camera 100 and the lens unit 200. The power supply control unit 113 detects, for example, the presence or absence of a battery in the power source unit 114, the type of the battery, or the remaining battery capacity. Consequently, the power supply control unit 113 controls the DC-DC converter in accordance with the detection result and the instructions from the CPU 109 to supply the necessary voltage to each component in the camera 100 and lens unit 200 during the necessary period.

An operating unit 116 is an input device group including an operating member, such as a switch, a button, or a dial, that the user uses to give the instructions or configure the settings to the camera 100. The operating unit 116 includes, for example, a power switch, a release button, a menu button, a direction button, and an execution button. Note that the display unit 107 may be a capacitance touch panel such that the user can input the information by selecting the UI displayed on the display unit 107 as well as by operating the operating unit 116.

The operating unit 116 is further provided with a mode setting switch. Thus, the user can set the image sensing mode by operating the mode setting switch. The CPU 109 sets the image sensing mode of the camera 100 in response to the operation of the mode setting switch by the user.

Note that the user can set the image sensing mode at an arbitrary timing as long as the power of the camera 100 is turned on. It is assumed in the interval image sensing mode described below that the first image is captured after the user sets the camera 100 to the interval image sensing mode in advance.

Note that the camera 100 of the present embodiment can be set to the interval image sensing mode (a first mode) in which the images of an object are captured sequentially based on the set time intervals, and to a normal image sensing mode (a second mode) in which the images of the object are captured one by one.

An accessory shoe 117 is an attachment unit at which a detachable electronic appliance is attached to the camera 100. The electronic appliance to be attached to the camera 100 is, for example, an external strobe, an electronic viewfinder such as an EVF, or a GPS unit.

Note that each of the inside of the accessory shoe 117 and a side of the electronic appliance described above is provided with a terminal group including a plurality of terminals. Electrically connecting the terminal groups enables the camera 100 to communicate with an electronic appliance that can communicate with the camera 100.

The light metering sensor 112 is a light metering unit that measures the luminance of the object. The image processing unit 104 calculates the luminance value of the object (the image processing unit 104 performs a light metering operation) based on the image data acquired with the light metering sensor 112. The details of the operation will be described below.

The configuration of the strobe 300 embedded in the camera 100 will be described hereinafter. The strobe 300 of the present embodiment is a light emission unit that lights the object.

A charge circuit 301 is configured to raise the voltage output from the power source unit 114 to a predetermined voltage. A main capacitor 302 is a charging unit configured to accumulate the charge corresponding to the predetermined voltage output from the charge circuit 301. A discharge circuit 303 is configured to supply the charge accumulated in the main capacitor 302 to alight emission unit 304. Then, the light emission unit 304 is configured to light the object with the amount of light emission corresponding to the charge supplied from the main capacitor 302 through the discharge circuit 303.

While the power of the camera 100 is turned on, the charge circuit 301 raises the voltage output from the power source unit 114 to a predetermined voltage in response to the instructions from the CPU 109 such that the charge corresponding to the predetermined voltage is accumulated in the main capacitor 302. When quantities of charge sufficient to raise the voltage in the main capacitor 302 to the predetermined voltage is measured in the main capacitor 302, the charge corresponding to the predetermined voltage is supplied from the main capacitor 302 through the discharge circuit 303 to the light emission unit 304. The light emission unit 304 emits a flashlight with the amount of light emission corresponding to the supplied charge. The configuration described above enables the strobe 300 of the present embodiment to light the object. Note that the predetermined voltage described above is a voltage necessary to acquire the amount of light emission to light the object appropriately.

When the strobe 300 emits a light in synchronization with image capture of the object, the CPU 109 in the present embodiment determines whether the charge corresponding to the predetermined voltage is accumulated in the main capacitor 302. Specifically, the present embodiment is configured to determine whether the charge corresponding to the predetermined voltage is accumulated in the main capacitor 302 by determining whether the charge is accumulated in the main capacitor 302 sufficiently to raise the charging voltage in the main capacitor 302 to the predetermined voltage.

Even if a command for image capture of the object is issued, the camera 100 of the present embodiment fails to capture an image of the object until the CPU 109 determined that the charge is accumulated sufficiently to raise the voltage in the main capacitor 302 to the predetermined voltage. Note that the camera 100 may capture an image of the object without a light emission of the strobe 300 if a command for image capture of the object is issued before the CPU 109 determines that the charge is accumulated sufficiently to raise the voltage in the main capacitor 302 to the predetermined voltage. The image processing unit 104 provided in the camera 100 of the present embodiment performs an arithmetic process for adjusting light. However, an arithmetic processing unit for a light adjustment process may separately be provided in the strobe 300.

Note that the camera 100 may measure the voltage in the main capacitor 302 at a predetermined timing in accordance with the interval T_int when the camera 100 is set in the interval image sensing mode. Alternatively, the camera 100 may measure the voltage in the main capacitor 302 with the CPU 109 as needed to charge the predetermined voltage based on the interval T_int. The basic configuration of the camera 100 has been described above.

Interval Image Sensing Process

The operation of the camera 100 and the lens unit 200 in an interval image sensing process for sensing an image of an object with the light emission of the strobe 300 (hereinafter, referred to as an interval image sensing process) will be described. Note that, in the description below, the information about the acquired image (data), the amount of exposure, or the evaluation value is acquired and then recorded in the memory 105 such that the CPU 109 reads the information appropriately. The process when it is determined in a strobe light emission determination to cause the strobe 300 to emit a light (in a first image capture) will be described hereinafter.

First, the user sets the camera 100 to the interval image sensing mode by operating the operating unit 116. Meanwhile, the user sets the interval T_int, and the total number of images to be captured, or the total period of image sensing by operating the operating unit 116. The information set by the user is recorded in the memory 105. Note that the interval T_int, the total number of image capture, and the like may separately be set. Selecting predetermined conditions for the interval image sensing may set the interval T_int, the total number of image capture, and the like.

Next, when the user operates the release button on the operating unit 116, the CPU 109 determines whether the release button on the operating unit 116 is set in an SW1 state (for example, a half-stroke state).

When it is determined in the determination that the release button is set in the SW1 state, the image processing unit (distance acquiring unit) 104 performs a focus process (AF process) based on the image data, such as a live view, acquired in advance. As for the details of the AF process, the image processing unit 104 calculates the AF evaluation value (distance information) from the information about the contrast among the luminance components in the image data such that the lens control unit 203 sets the position of each lens of the image sensing lens group 201 based on the AF evaluation value. Note that any publicly known method may be used as the method for calculating the distance information. The present embodiment is configured to perform the AF process using the digital image data acquired with the image-capturing device 102. However, the AF process is not limited to the present embodiment. For example, the AF process may be performed based on the image data acquired with the light metering sensor 112 or a sensor for the AF (not illustrated).

When it is determined that the release button is in the SW1 state, the image processing unit 104 acquires the image data for metering the light with the light metering sensor 112. The image processing unit 104 performs a light metering operation based on the acquired image data for metering the light. Note that the light metering operation may be performed based on the image data acquired with the image-capturing device 102.

Then, a frame in the acquired image data for metering the light is divided into a plurality of blocks and the average brightness values is calculated per block in the method for the light metering operation of the present embodiment. Then, the average brightness values of all of the blocks are integrated to calculate the representative brightness value. The representative brightness value is used as the information about the luminance of the object in the subsequent processes. Note that any publicly known method may be used as the method of the light metering operation. The information about the luminance of the object may be calculated, for example, using a method, such as a spot photometry or a center-weighted photometry.

Next, the image processing unit 104 reads the calculated information about the luminance of the object from the memory 105 to set the amount of exposure such that the object has an appropriate brightness based on the luminance information (the AE process). Note that the amount of exposure in the present embodiment is a value used for setting the brightness of the image data to be acquired. The value is set by changing the exposure conditions including the aperture value, the exposure period (accumulation period), and the gain (the ISO sensitivity).

Next, the image processing unit 104 reads the calculated luminance information and amount of exposure of the object from the memory 105 to calculate the amount of light emission when the light emission unit 304 emits a light (light adjustment operation). The CPU 109 accumulates the charge corresponding to the voltage in the main capacitor 302 such that the voltage corresponds to the amount of light emission acquired in the light adjustment operation.

The case in which the strobe 300 emits a light at the first image capture in a series of interval image sensing has been described above. However, the light emission is not limited to the description above. For example, it may be determined whether to cause the strobe 300 to emit a light as described below at the first image capture in a series of interval image sensing. The details of the light emission determination will be described below.

The AF process and various processes except for the AF process described above may be performed in any order. Alternatively, the processes may be performed in parallel. The various processes and operations described above are the preparation in the camera 100, the lens unit 200, and the strobe 300 before an image of the object is captured (hereinafter, referred to as a pre-image-capture preparation).

When the pre-image-capture preparation is completed, the CPU 109 determines whether the release button on the operating unit 116 is set in an SW2 state (for example, a state in which the user fully presses the button).

When it is determined that the release button is set in the SW2 state, the CPU 109 causes the image-capturing device 102 to capture an image of the object in synchronization with the light emission of the strobe 300 and acquires the analog image data. The acquired analog image data is transformed into digital image data with the A/D converting unit 103. The digital data is processed in the various processes described above with the image processing unit 104, and then is recorded in the memory 105. The processed digital image data is read from the memory 105 with the CPU 109 and then is transformed into analog image data for display with the D/A converting unit 106. The analog image data is displayed as a quick review display on the display unit 107. The digital image data recorded in the memory 105 is read with the CPU 109 and is recorded in the recording medium 108.

Once it is determined that the release button is set in the SW2 state, the built-in timer 115 starts measuring the interval T_int. Meanwhile, the CPU 109 starts counting the number of image capture of the object. When the counted number reaches the set total number of image capture, a series of interval image sensing is completed.

In the subsequent operation, the camera 100 performs the various processes and controls based on the interval T_int. Note that, although the present embodiment sets the period of the interval image sensing based on the total number of image capture without measuring the total time of image sensing, the interval image sensing may be performed based on the total time of image sensing. If the total time of image sensing is measured, the measurement starts at the same timing as the time when the count starts in the present embodiment.

In the interval image sensing mode, the user captures the first image by operating the release switch on the operating unit 116. The second and subsequent image capture is performed automatically. Specifically, the images of the object after the first image capture are captured automatically at predetermined time intervals (the intervals T_int). In such a case, the built-in timer 115 measures the time related to the interval T_int.

Note that, although the user directly operates the release button on the operating unit 116 to shift the release button to the SW1 state and to the SW2 state in the present embodiment, the operation of the release button is not limited to the present embodiment. For example, a detachable external release button may be attached to the camera 100 and be operated. When the camera 100 can communicate via radio waves, an image of the object can be captured by remote control of a portable electronic appliance such as a smartphone or a tablet terminal. Alternatively, the image capture of the object may start automatically after an arbitrary period of time has elapsed since the direct operation of the release button by the user. The operation when the camera 100 captures the first image of the object in the interval image sensing mode has been described above.

Hereinafter, the interval image sensing process performed in the camera 100 after the completion of the first image capture will be described with reference to FIG. 2. FIG. 2 is a flowchart of the interval image sensing process in the camera 100 that is the first embodiment of the image capturing apparatus according to the present invention.

Figure 2:
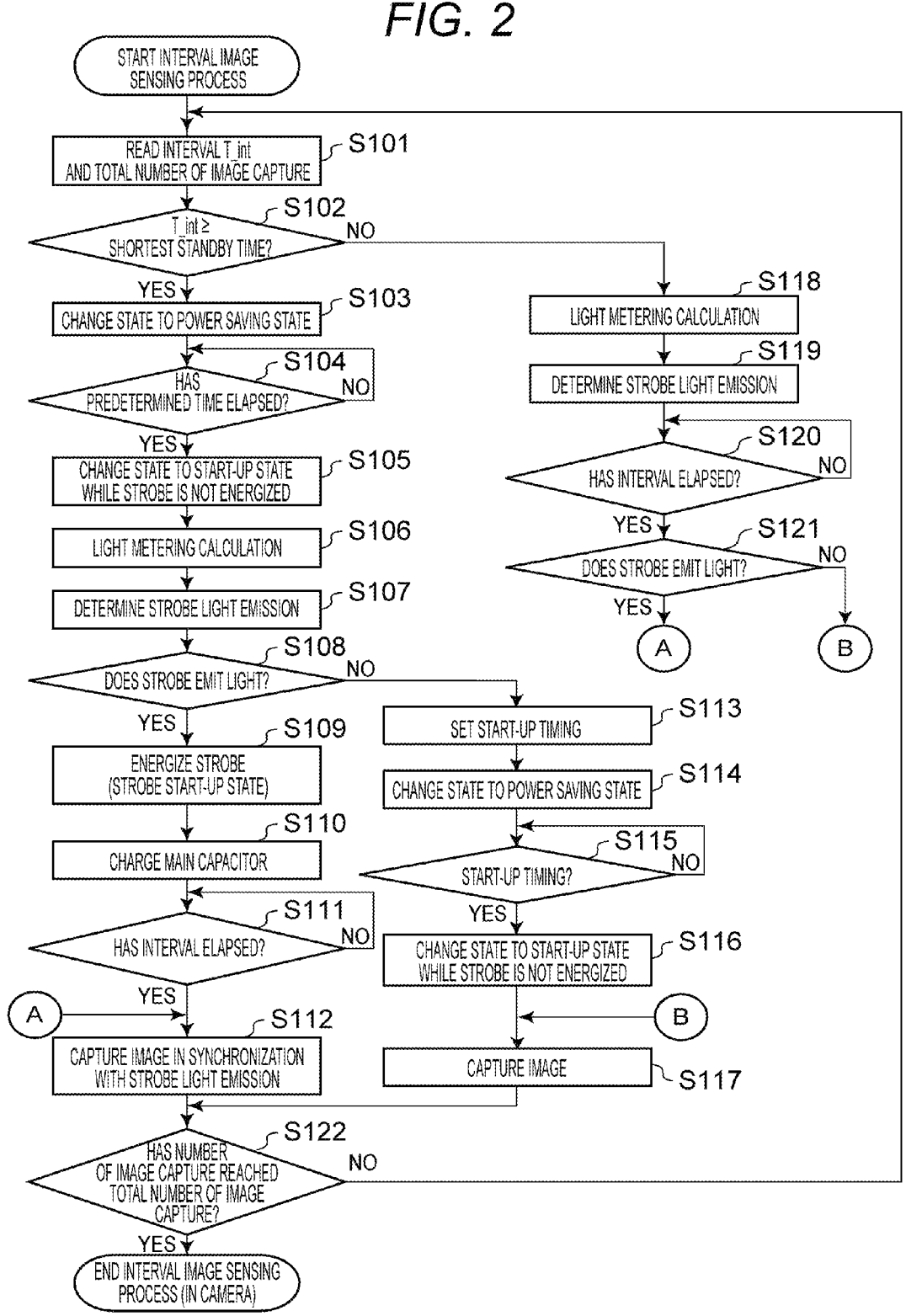
FIG. 2 is a flowchart of an interval image sensing process in the digital camera 100 that is the first embodiment of the image capturing apparatus according to the present invention.

As illustrated in FIG. 2, the CPU 109 reads the set interval T_int and total number of image capture from the memory 105 in step S101 after the completion of the first image capture.

Next, the CPU 109 determines in step S102 whether the set interval T_int is the shortest standby time or longer. When the CPU 109 determines in step S102 that the interval T_int is the shortest standby time or longer, the process goes to step S103. When the CPU 109 determines that the interval T_int is shorter than the shortest standby time, the process goes to step S118. In other words, when the interval T_int is shorter than the shortest standby time, the CPU 109 does not change the operation state of the camera 100 (the CPU 109 maintains the operation state of the camera 100 in a start-up state).

This is because maintaining the operation state of the camera 100 prevents the increase in the electric power consumption due to the change of the operation state. For example, when the set interval T_int is relatively short, the change of the operation state of the camera 100 increases the electric power consumption (amount) in the camera 100 in comparison with the case in which the operation state is not changed.

In light of the foregoing, the camera 100 of the present embodiment continues the interval image sensing process without changing the operation state of the camera 100 from the start-up state to a power saving state when the interval T_int is shorter than the shortest standby time. Such a configuration can prevent unnecessary electric power consumption in the camera 100. The shortest standby time may have any length. The length is 10 seconds in the present embodiment as an example. Note that the shortest standby time may be changed depending on the presence or absence of the light emission of the strobe 300, or the time required to charge the main capacitor 302.

When it is determined in step S102 that the interval T_int is the shortest standby time or longer. The CPU (a second state-changing unit) 109 starts the operation for changing the operation state of the camera 100 in step S103. Specifically, the CPU 109 starts the operation for changing the operation state of the camera 100 from the start-up state in which an image of the object may be captured (a third state) to a power saving state in which the electric power consumption is lower than that in the start-up state (a four state). In synchronization with the timing, the built-in timer 115 starts measuring the time, separately from the measurement of the interval T_int. The details will be described below.

Note that the power saving state of the camera 100 is a state in which all of the operations in the camera 100 and the lens unit 200 stop except for some operations, for example, related to the measurement of the time. Note that the energization from the power source unit 114 to the charge circuit 301 of the strobe 300 (hereinafter, referred to as energization to the strobe 300) is not performed when the operation state of the camera 100 is changed to the power saving state.

Note that the power saving state (of the camera 100) in the present embodiment is a state in which all of the operations except for the measurement of time with the built-in timer 115 stop. The power saving state is not limited to the present embodiment. It is preferable in the power saving state of the present embodiment that the camera 100 does not capture an image of the object or perform an operation described below for determining the light emission of the strobe because the capture or the operation consumes relatively large electric power. In other words, it is preferable in the power saving state of the camera 100 in the present embodiment that at least the image-capturing device 102, image processing unit 104, CPU 109, and light metering sensor 112 (or the corresponding circuit) illustrated in FIG. 1 stop. Such a configuration can decrease the electric power consumption in the camera 100 in the power saving state in comparison with that in the start-up state.

In the present embodiment, a state in which the strobe 300 is energized is a strobe start-up state (a first state), and a state in which the strobe 300 is not energized is a strobe power saving state (a second state). The CPU (the first state-changing unit) 109 can change the state of the strobe 300 between the energization state and non-energization state (the change of the state of the strobe 300).

In other words, the CPU 109 starts the operation for changing the state of the strobe 300 from the strobe start-up state to the strobe power saving state when starting the operation for changing the operation state of the camera 100 from the start-up state to the power saving state.

Note that, although the change between the energization state and non-energization state of the strobe 300 changes the state of the strobe 300 in the present embodiment, the change of the state of the strobe 300 is not limited to the present embodiment. The strobe 300 may have any configuration, at least, as long as the electric power consumption in the strobe power saving state is lower than that in the strobe start-up state. Especially, the operation for charging the main capacitor 302, which consumes large electric power, preferably stops in the strobe power saving state. The operation state of the camera 100 may be in any state, at least, as long as the electric power consumption in the power saving state is lower than that in the start-up state.

Next, the CPU 109 determines in step S104 whether a predetermined period of time has elapsed since the built-in timer 115 has started the measurement in step S103. When the CPU 109 determines in step S104 that a predetermined period of time has not elapsed, the process in step S104 is repeated. Note that the predetermined period of time has any length as long as the remaining time acquired by subtracting the predetermined period of time from the interval T_int is long enough to accumulate the charge corresponding to the predetermined voltage in the main capacitor 302.

Next, the CPU 109 starts the operation for the operation state of the camera 100 to the start-up state in step S105. Note that the strobe 300 is maintained in the strobe power saving state because the strobe 300 is not energized at that time.

Next, in step S106, the image processing unit 104 acquires the image data for metering the light with the light metering sensor 112 and performs the light metering operation based on the acquired image data. Specifically, the image processing unit 104 acquires the information about the luminance of the object, which has been calculated with the image data for metering the light acquired with the light metering sensor 112.

Next, the CPU 109 determines in step S107 based on the acquired information about the luminance of the object whether to cause the light emission unit 304 to emit a light. In other words, the CPU 109 working as a light emission determining unit can determine based on the information about the luminance of the object whether to cause the light emission unit 304 in the strobe 300 to emit a light for the next image capture of the object (light emission determination).

Note that the CPU 109 performs the light emission determination in the period between image capture and the next image capture with the image capturing apparatus.

Such a configuration can determine whether to cause the strobe 300 to emit a light in accordance with the variations in luminance of the object in the period between image capture and the next image capture.

For example, even after the strobe 300 has emitted a light in image capture, the light emission of the strobe 300 in synchronization with the next image capture is not required when the luminance of the object is changed into a state in which the light emission of the strobe 300 is not required by the next image capture.

In such a case, the configuration described above enables the camera 100 of the present embodiment to determine, in an interval between the image capture in the interval image sensing, the necessity of the light emission of the strobe 300. This can prevent unnecessary light emission of the strobe 300. In other words, when it is determined that the light emission of the strobe 300 is not required in an interval between the image capture in the interval image sensing, the strobe 300 may be maintained in the strobe power saving state at least until the next image capture (the next light emission determination).

Consequently, when the light emission of the strobe 300 is not required, the strobe 300 may be maintained in the strobe power saving state. This can curb the electric power consumption in the camera 100.

Referring to FIG. 2 again, the CPU 109 changes the processes in and after step S108 in response to the results from the light emission determination in step S107. When it is determined in step S107 to cause the strobe 300 to emit a light, the process goes to step S109. When it is determined not to cause the strobe 300 to emit a light, the process goes to step S113.

The CPU 109 starts supplying electric power from the power source unit 114 to the charge circuit 301 in step S109. In other words, when it is determined, in the light emission determination, to cause the strobe 300 to emit a light, the CPU 109 energizes the strobe 300 to start the operation for changing the state of the strobe 300 from the strobe power saving state to the strobe start-up state.

Next, the CPU 109 starts charging the main capacitor 302 in step S110. Then, when the CPU 109 detects that the charging voltage in the main capacitor 302 has reached a predetermined voltage, the process goes to step S111.

Note that, although the present embodiment detects whether the charging voltage in the main capacitor 302 has reached a predetermined voltage by directly detecting the voltage in the main capacitor 302, the detection is not limited to the present embodiment. For example, detecting the variations in resistance value of a peripheral circuit may detect whether the charging voltage of the main capacitor 302 has reached the predetermined voltage. Alternatively, the CPU 109 may calculate the charging time required to accumulate the charge corresponding to the predetermined voltage in the main capacitor 302 in advance so as to determine whether the calculated charging time has elapsed.

Next, the CPU 109 determines in step S111 whether the period of time that has elapsed since the previous image capture and measured with the built-in timer 115 exceeds the interval T_int. The determining process is repeated until the CPU 109 determines that the elapsed period of time exceeds the interval T_int.

The CPU 109 captures an image of the object using the image capturing apparatus including the image-capturing device 102 in synchronization with the light emission of the light emission unit 304 in step S112. The acquired image data is variously processed, for example, with the A/D converting unit 103 or the image processing unit 104, and then is appropriately recorded in the memory 105 or the recording medium 108. At that time, the CPU 109 updates the number of the image capture already done by additionally recording the current number of image capture in the memory 105. Note that the acquired image data may be displayed as a quick review display on the display unit 107 after being transformed into analog image data for display with the D/A converting unit 106.

Next, the CPU 109 reads the total number of image capture and the number of the image capture already done recorded in the memory 105, and determines whether the number of the image capture already done reaches the total number of image capture in step S122.

When it is determined in step S122 that the number of the image capture already done does not reach the total number of image capture, the process goes back to step S101 to continue the interval image sensing process. Note that the processes in steps S101 to S102 are omitted except when the user changes the interval T_int or the total number of image capture.

When it is determined in step S122 that the number of the image capture already done reaches the total number of image capture, the built-in timer 115 finishes measuring the time and the interval image sensing process in the camera 100 is terminated. Note that it is determined in the present embodiment to continue the interval image sensing process in accordance with the total number of image capture. However, it may be determined to continue the interval image sensing process by the comparison of the total time of image sensing with the elapsed time.

Figure 3:
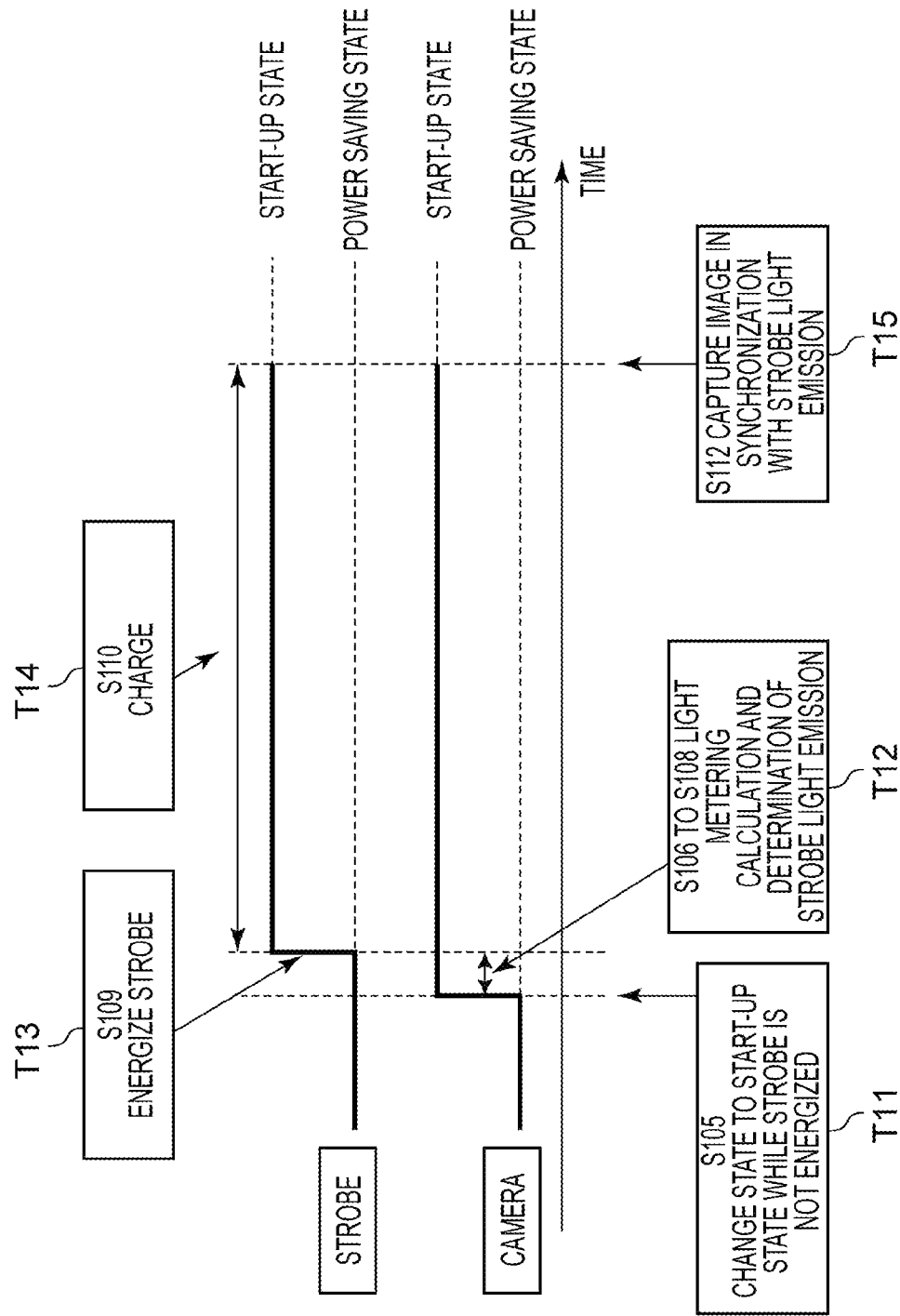
FIG. 3 is a timing diagram of each operation when a strobe 300 emits a light in the digital camera 100 that is the first embodiment of the image capturing apparatus according to the present invention.

The timing for each operation or process in the camera 100 when it is determined to cause the strobe 300 to emit a light in the strobe light emission determination will be described with reference to FIG. 3. FIG. 3 is a timing diagram when the strobe 300 emits a light in the camera 100 that is the first embodiment of the image capturing apparatus according to the present invention. In FIG. 3, the time course is shown on the horizontal axis, and the states of the camera 100 and strobe 300 are shown on the vertical axis. Note that the operations corresponding to the processes in the flowchart illustrated in FIG. 2 are denoted with the same reference signs as those in FIG. 2.

As illustrated in FIG. 3, the camera 100 starts the operation for changing the operation state of the camera 100 from the power saving state to the start-up state at a timing T11 after the previous image capture has been completed (step S105). Note that the timing T11 is an exemplary timing when the predetermined period of time has elapsed since the previous image capture. The strobe 300 is in the non-energization state (the strobe power saving state) at the timing T11.

The camera 100 performs the light metering operation and the light emission determination of the strobe 300 at a timing T12 (steps S106 to S108). When it is determined in the light emission determination to cause the light emission unit 304 of the strobe 300 to emit a light, the energization of the strobe 300 starts at a timing T13. In other words, the CPU 109 starts the operation for changing the state of the strobe 300 from the strobe power saving state to the strobe start-up state at that timing (step S109).

A period T14 is a charging time to accumulate the charge corresponding to the predetermined voltage in the main capacitor 302 of the strobe 300. As described above, the charging time may be calculated in advance.

When the charge corresponding to the predetermined voltage is accumulated in the main capacitor 302, the image capturing unit of the camera 100 captures an image of the object in synchronization with the light emission of the strobe 300 at a timing T15.

Referring to FIG. 2 again, the process when it is determined in step S108 not to cause the strobe 300 to emit a light will be described. The CPU 109 sets the start-up timing for changing the operation state of the camera 100 from the power saving state to the start-up state in step S113.

The strobe 300 is energized in step S113 because it is determined in the light emission determination not to cause the strobe 300 to emit a light as described above. Thus, the time required for the pre-image-capture preparation with the camera 100 is secured at the start-up timing described above. Specifically, the start-up timing is set in accordance with the time acquired by subtracting the time required for the pre-image-capture preparation from the time to the next image capture of the object based on the measurement of the time with the built-in timer 115. Note that, in the present embodiment, a period in which the camera 100 is maintained in the second state (a sleep period) may be calculated by setting (calculating) the start-up timing.

Next, the CPU 109 starts the operation for changing the operation state of the camera 100 from the start-up state (the third state) to the power saving state (the fourth state) in step S114. Meanwhile, the built-in timer 115 starts measuring the time at the timing at which the operation state of the camera 100 is changed from the start-up state to the power saving state. The built-in timer 115 measures the time related to the preset start-up timing.

At that time, the strobe 300 is still in the non-energization state and thus the state of the strobe 300 is maintained in the strobe power saving state. In other words, when it is determined in the light emission determination not to cause the strobe 300 to emit a light, the CPU 109 maintains the state of the strobe 300 in the strobe power saving state. Such a configuration enables the camera 100 of the present embodiment to curb unnecessary electric power supply to the strobe 300 when the strobe 300 does not emit a light (light emission is not required). Thus, the camera 100 of the present embodiment can curb the electric power consumption.

Next, the CPU 109 determines in step S115 whether the time that the built-in timer 115 has started measuring in step S113 reaches the start-up timing. The process in step S115 is repeated until the time that the built-in timer 115 measures reaches the start-up timing. At that time, the process, for example, for determining whether the interval T_int has elapsed since the previous image capture of the object (for example, the process similar to the process in step S111 described above) may be performed.

Note that the process in step S115 may determine whether the calculated sleep period has elapsed since the operation state of the camera 100 has been changed to the power saving state.

Next, the CPU 109 starts the operation for changing the operation state of the camera 100 from the power saving state (the fourth state) to the start-up state (the third state) based on the calculated start-up timing in step S116. In other words, the CPU changes the operation state of the camera 100 to a state in which an image of the object can be captured for the next image capture.

Next, the CPU 109 causes the image capturing unit provided in the camera 100 to capture an image of the object by operating the image capturing unit in step S117. The process in step S117 is similar to the process in step S112 except that the strobe 300 does not emit a light in step S117. After that, the process in step S122 is performed as described above.

Figure 4:
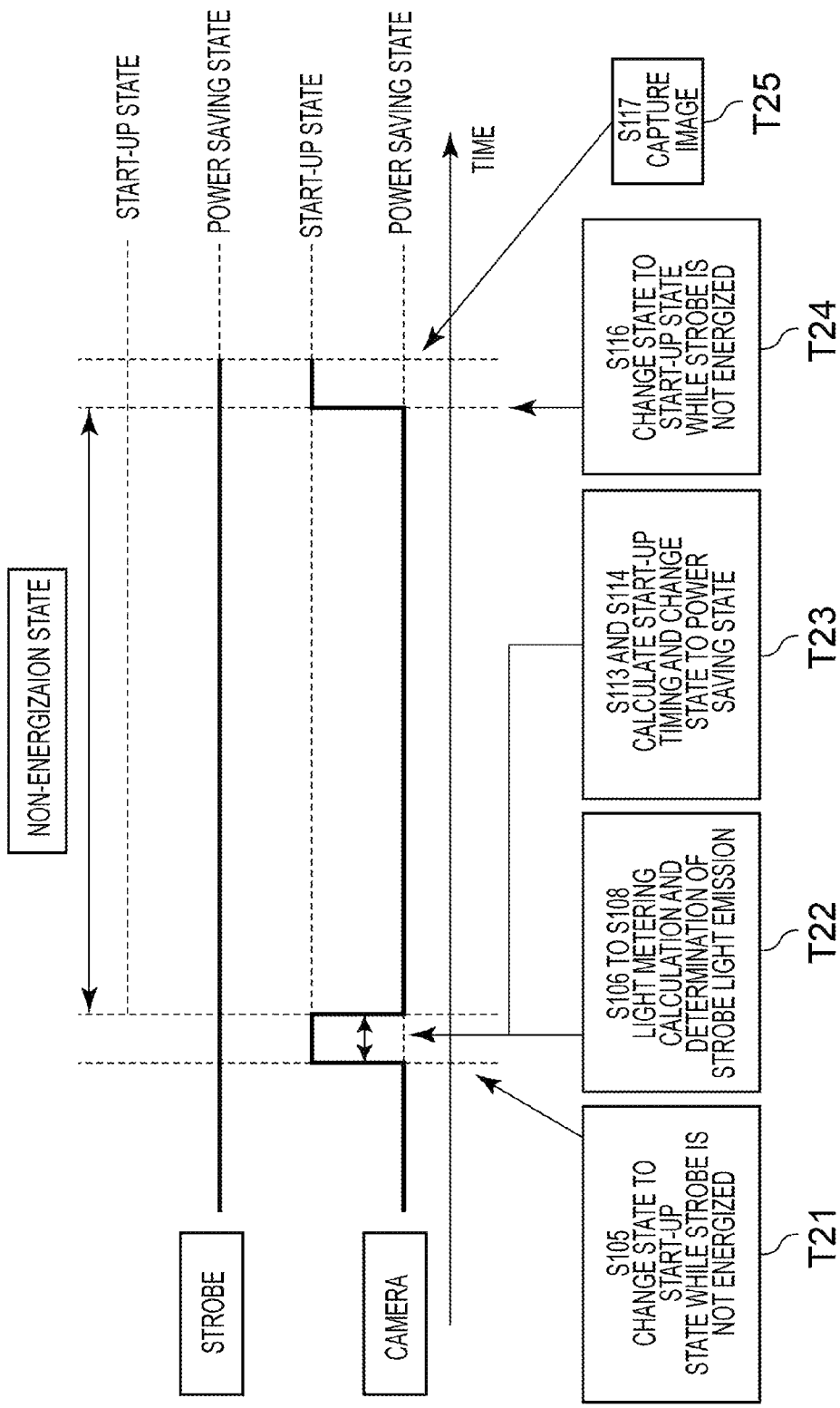
FIG. 4 is a timing diagram of each operation when the strobe 300 does not emit a light in the digital camera 100 that is the first embodiment of the image capturing apparatus according to the present invention.

The timing for each operation and process in the camera 100 when it is determined in the light emission determination not to cause the strobe 300 to emit a light will be described hereinafter with reference to FIG. 4. FIG. 4 is a timing diagram of each operation when the strobe 300 does not emit a light in the camera 100 that is the first embodiment of the image capturing apparatus according to the present invention. In FIG. 4, the time course is shown on the horizontal axis, and the states of the camera 100 and strobe 300 are shown on the vertical axis. Note that the operations corresponding to the processes in the flowchart illustrated in FIG. 2 are denoted with the same reference signs as those in FIG. 2.

As illustrated in FIG. 4, the CPU 109 starts the operation for changing the operation state of the camera 100 from the power saving state to the start-up state at a timing T21 after the previous image capture has been completed (step S105).

At that time, the strobe 300 is in the non-energization state (the strobe power saving state).

At a timing T22, the image processing unit 104 performs the light metering operation and the CPU 109 performs the strobe light emission determination (steps S106 to S108). When the CPU 109 determines not to cause the light emission unit 304 of the strobe 300 to emit a light, the CPU 109 calculates the start-up timing of the camera 100 at a timing T23. Subsequently, the CPU 109 starts the operation for changing the operation state of the camera 100 from the start-up state to the power saving state (steps S113 and S114). At that time, the strobe 300 is in the non-energization state (the strobe power saving state).

The CPU 109 starts the operation for changing the operation state of the camera 100 from the power saving state to the start-up state at a timing T24. The timing T24 is the start-up timing. Subsequently, the camera 100 captures an image of the object at a timing T25.

Referring to FIG. 2 again, the process when it is determined in step S102 that the interval T_int is shorter than the shortest standby time will be described. The descriptions of the processes in steps S118 and S119 are omitted because the processes are similar to the processes in steps S106 and S107 described above.

The CPU 109 determines in step S120 whether the elapsed time that the built-in timer 115 measures (the time elapsed since the camera 100 has captured the previous image) exceeds the interval T_int.

Next, the CPU 109 reads, in step S121, the result from the determination in step S119. When it is determined in step S119 to cause the strobe 300 to emit a light, the process goes to step S112. As described above, the CPU 109 subsequently captures an image of the object in synchronization with the light emission of the strobe 300.

When it is determined in step S119 not to cause the strobe 300 to emit a light, the process goes to step S117 such that the CPU 109 causes the image capturing unit provided in the camera 100 to capture an image of the object without the light emission of the strobe 300 by operating the image capturing unit. The interval image sensing process in the camera 100 has been described above.

As described above, the camera 100 of the present embodiment changes the state of the strobe 300 and the operation state of the camera 100 in accordance with the result from the light emission determination in an interval between the image capture in the interval image sensing.

Specifically, the camera 100 determines whether to cause the strobe 300 to emit a light by performing the light metering operation in a period between image capture and the next image capture in the interval image sensing. When it is determined in the determination not to cause the strobe 300 to emit a light, the camera 100 does not change the state of the strobe 300 (maintains the state in the power saving state) while changing the operation state of the camera 100 to the power saving state. After that, the camera 100 changes the operation state of the camera 100 to the start-up state again at the timing of the preparation before an image of the object is captured.

When it is determined in the determination to cause the strobe 300 to emit a light, the camera 100 changes the state of the strobe 300 to the start-up state. At that time, the operation state of the camera 100 is maintained in the start-up state (the operation state is not changed). After that, the camera 100 changes the operation state of the camera 100 to the start-up state again at the timing of the preparation before an image of the object is captured.

The configuration described above enables the camera 100 of the present embodiment to prevent unnecessary energization of the strobe 300 if it is determined, in a period between image capture and the next image capture, that the light emission of the strobe 300 is not required. Thus, the camera 100 of the present embodiment can curb the electric power consumption in the image capturing apparatus when a plurality of images of the object is captured based on the set time intervals.

Note that, although the power supply control of the camera 100 and the strobe 300 in the interval image sensing has been described in the present embodiment, the present invention is not limited to the present embodiment. For example, the present invention is also effective when the camera 100 is set in an image sensing mode in which an image of the object is captured at a time set by the user (namely, in a self-timer image sensing mode).

As described above, the image capturing apparatus of the present invention can curb the electric power consumption in the image capturing apparatus not only in the interval image sensing but also in image capture in which an image of the object is captured at the set time.

Note that, although the strobe light emission determination in the present embodiment is performed based on the result from the light metering operation, the strobe light emission determination is not limited to the present embodiment. For example, the strobe light emission determination may be performed based on the AF evaluation value described above (the information about the distance to the object).

Specifically, the CPU 109 determines based on the AF evaluation value whether the distance from the camera 100 to the main object is longer than a predetermined distance. When determining that the distance from the camera 100 to the main object is longer than the predetermined distance, the CPU 109 controls the strobe 300 such that the strobe 300 does not emit a light. This is because it is considered that a long distance between the camera 100 and the main object reduces the effect of lighting the object with the strobe 300.

Note that the AF evaluation value may be calculated in the same method as the method in the AF process described above. Alternatively, the information about the distance to the object may be found in another publicly known method.

Alternatively, the CPU (scene determining unit) 109 may determine a scene to be captured when the camera 100 captures an image of the object so as to determine whether to cause the strobe 300 to emit a light based on the determination of the scene.

For example, when the main object is against the light, the representative brightness value of the object is relatively high. Thus, a light emission determination only based on the result from the light metering operation sometimes causes the CPU 109 to control the strobe 300 such that the strobe 300 does not emit a light.

In light of the foregoing, a live view is acquired such that the image capturing unit determines a scene to be captured in response to the instructions from the CPU 109. The image processing unit 104 determines a scene of the object to be captured based on the acquired live view. For example, when it is determined that a scene to be captured in the live view is against the light as the result from the determination, the CPU 109 control the strobe 300 to emit a light. The configuration described above can determine the necessity of the light emission of the strobe 300 in accordance with a scene of the object to be captured.

Note that any configuration may obtain the live view as long as the configuration acquires the live view in step S105 or S119. Any configuration may perform the light emission determination based on the live view as long as the configuration performs the light emission determination in step S106 or S120.

The camera 100 may determine a scene to be captured other than the scene against the light described above. The camera 100 may be configured to simultaneously perform the light metering operation, the acquisition of the information about the distance, and the determination of the scene to be captured or to perform an arbitrary combination of the light metering operation, the acquisition of the information about the distance, and the determination of the scene to be captured. The present embodiment may use any method other than the method described above as long as the method can determine whether to cause the strobe 300 to emit a light.

A built-in strobe embedded in the camera 100 is used as the strobe 300 in the present embodiment. However, the strobe is not limited to the present embodiment. For example, an external light emission device capable of communicating with the camera 100 (hereinafter, referred to as an external strobe) may be used as the strobe 300. In such a case, the strobe 300 is connected to the accessory shoe 117 provided in the camera 100.

Furthermore, a strobe control unit configured to generally control the operation and process in the strobe 300 is preferably provided in the strobe 300 that is an external strobe. The strobe control unit controls the strobe 300, for example, changes the state of the strobe 300 based on the control signals received, for example, from the CPU 109 of the camera 100.

Note that it is assumed that the strobe 300 of the present embodiment requires the operation for charging the main capacitor 302 (the pre-image-capture preparation) at least in order to cause the light emission unit 304 to emit a light.

The present embodiment controls the energization of the strobe 300 from the camera 100 in accordance with the result from the strobe light emission determination. However, the control is not limited to the present embodiment. For example, the strobe 300 may be in a strobe power saving state in which the energization of the charge circuit 301 is maintained while the main capacitor 302 is not charged.

When it is determined in step S108 not to cause the strobe 300 to emit a light, the operation state of the camera 100 may be set in accordance with the remaining time to the next image capture. Specifically, before the process in step S113, the CPU 109 reads (calculates) the remaining time to the next image capture based on the interval T_int that the built-in timer 115 measures. When the remaining time is shorter than a predetermined period of time, the CPU 109 maintains the operation state of the camera 100 in the start-up state until the next image capture.

Such a configuration can prevent the operation state of the camera 100 from frequently changing when the remaining time from the light emission determination to the next image capture is relatively short. Changing the operation state of the camera 100 between the start-up state and the power saving state alternately at relatively short time intervals increases the electric power consumption in the camera 100. In light of the foregoing, the configuration described above can curb the electric power consumption in the camera 100 without changing the operation state of the camera 100 when the remaining time from the light emission determination to the next image capture is relatively short.

Second Embodiment

A case in which the operation state of a digital camera (hereinafter, referred to merely as a camera) 100 is set in a power saving state until the start of a pre-image-capture preparation when it is determined in a light emission determination to cause a strobe 300 to emit a light will be described in the present embodiment with reference to FIGS. 5 and 6. The descriptions of the same components in the camera 100 and a lens unit 200 as the components in the first embodiment will be omitted hereinafter.

Figure 5:
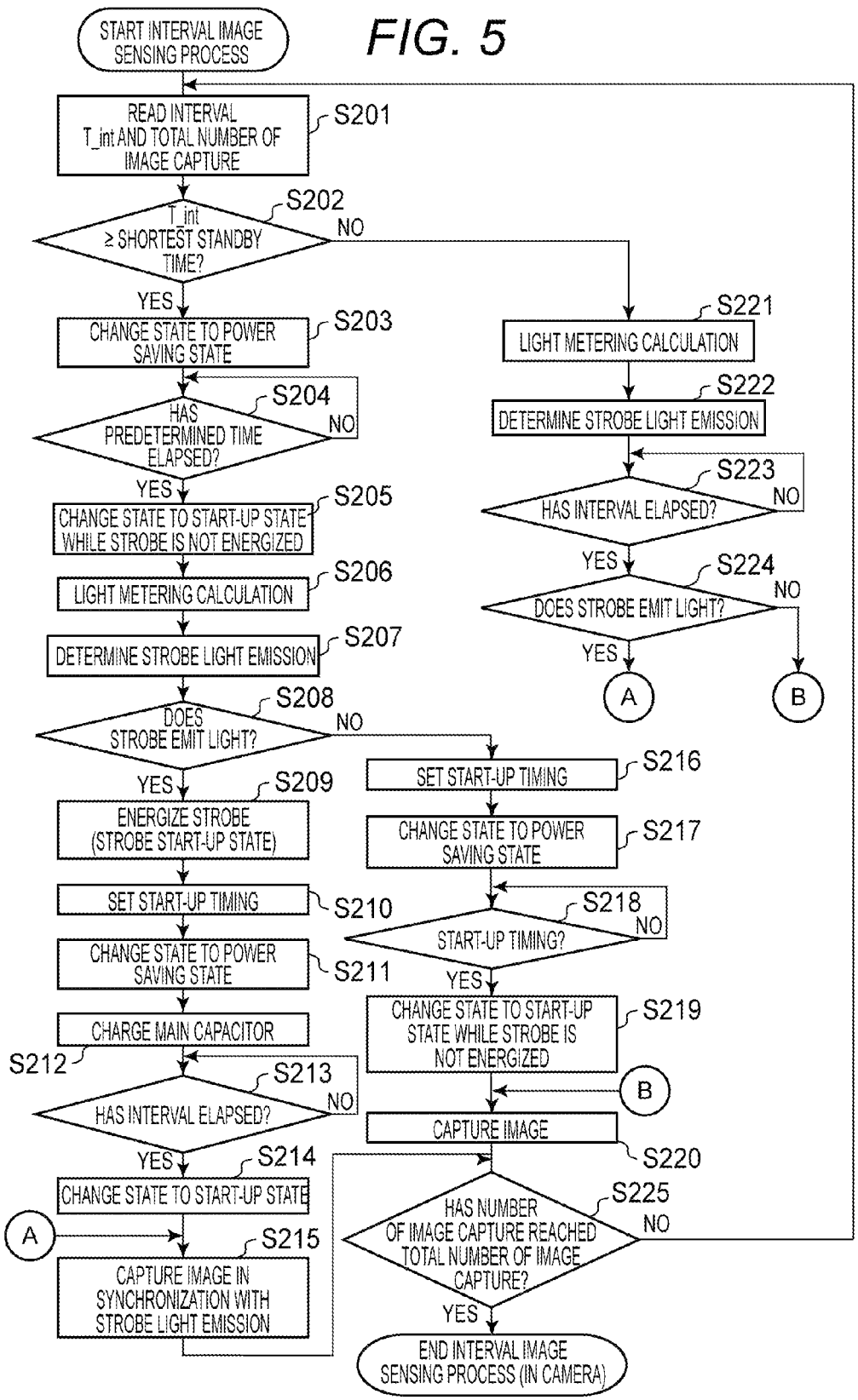
FIG. 5 is a flowchart of an interval image sensing process in the digital camera 100 that is a second embodiment of the image capturing apparatus according to the present invention
Figure 6:
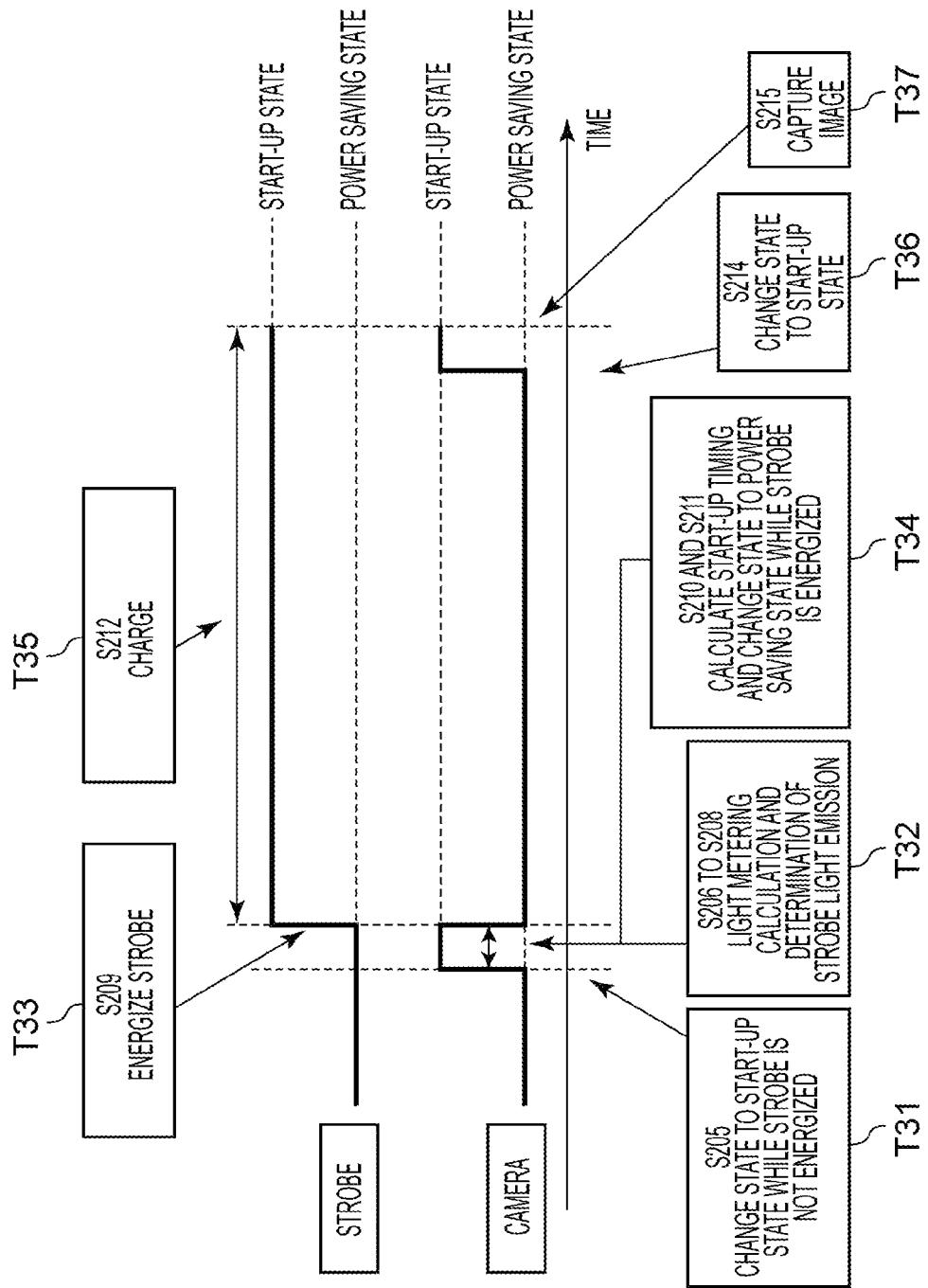
FIG. 6 is a timing diagram of each operation when a strobe 300 emits a light in the digital camera 100 that is the second embodiment of the image capturing apparatus according to the present invention.

FIG. 5 is a flowchart of an interval image sensing process in the camera 100 that is the second embodiment of the image capturing apparatus according to the present invention. FIG. 6 is a timing diagram of each operation when the strobe 300, which is a light emission unit of the present embodiment in the camera 100 that is the second embodiment of the image capturing apparatus of the present invention, emits a light. Note that the operation corresponding to each process in the flowchart illustrated in FIG. 5 is denoted with the same number. The process after the camera 100 has captured the first image of an object while the camera 100 is set in an interval image sensing mode will be described below.

The descriptions of the processes in steps S201 to S209 illustrated in FIG. 5 will be omitted because the processes similar to the processes in steps S101 to S109 in the first embodiment. In step S210, the CPU 109 calculates a start-up timing in which the operation state of the camera 100 is changed from the power saving state to the start-up state.

In most cases, the time required for an AF process or the like is shorter than the time required to accumulate the charge corresponding to a predetermined voltage in the main capacitor 302. In other words, the time required for a pre-image-capture preparation related to the operation other than the operation of the strobe 300 is shorter than the time required for the pre-image-capture preparation related to the operation of the strobe 300.

In light of the foregoing, the camera 100 of the present embodiment maintains the operation state of the camera 100 in the power saving state (a fourth state) after the light emission determination until the timing of the start of pre-image-capture preparation in the camera 100 regardless of the result from the determination of the light emission of the strobe 300. Such a configuration can further curb the electric power consumption in the camera 100 when an image of the object is captured with the light emission of the strobe 300. The details will be described hereinafter.

Similarly to the first embodiment, a timing in which a time required for the pre-image-capture preparation of the camera 100 can be secured is set as the start-up timing of the present embodiment based on an interval T_int. Note that setting (calculating) the start-up timing can also calculate a sleep period of the camera 100. The information about the set (calculated) start-up timing (and sleep period) is temporarily recorded in the memory 105.

Next, the CPU 109 reads the calculated start-up timing from the memory 105 in step S211. The CPU 109 starts the operation for changing the operation state of the camera 100 from the start-up state (the third state) to the power saving state (the fourth state) based on the start-up timing. Meanwhile, the built-in timer 115 starts measuring the time from the timing in which the operation state of the camera 100 is changed to the power saving state. Note that the strobe 300 is energized (in the strobe start-up state) in order to charge the main capacitor 302 at that time.

The descriptions of the subsequent processes in steps S212 and S213 are omitted because the processes are similar to the processes in steps S110 and S111 in the first embodiment. The CPU 109 reads the calculated start-up timing from the memory 105 and starts the operation for changing the operation state of the camera 100 from the power saving state to the start-up state based on the start-up timing in step S214. The descriptions of the subsequent processes in steps S215 to S225 are omitted because the processes are similar to the processes in steps S112 and S122 in the first embodiment.

Note that the processes in steps S209 to S212 are performed in order in the present embodiment. However, the order is not limited to the present embodiment. For example, the start-up timing of the camera 100 may be calculated (step S210) before the energization of the strobe 300 (step S209). The main capacitor 302 may be charged (step S212) before the start-up timing is calculated (step S210).

The timing for each operation or process related to the operation of the camera 100 in the present embodiment described above will be described with reference to FIG. 6. As illustrated in FIG. 6, at a timing T31 after the first image capture, the camera 100 starts the operation for changing the operation state of the camera 100 from the power saving state to the start-up state (step S205). Note that the timing T31 is the same as the timing T11 in the first embodiment.

The light metering operation in the camera 100 and the determination of the light emission of the strobe 300 are performed at a timing T32 (steps S206 to S208).

When it is determined in the light emission determination to cause the strobe 300 to emit a light, the CPU 109 starts the energization of the strobe 300 at a timing T33. In other words, the CPU 109 starts the operation for changing the state of the strobe 300 from the strobe power saving state to the strobe start-up state (step S209).

The CPU 109 starts the operation for changing the operation state of the camera 100 to the power saving state after calculating the start-up timing at a timing T34 (steps S210 and S211).

Note that the components related to the operation for charging the main capacitor 302 in the camera 100 can operate even when the operation state of the camera 100 is set in the power saving state.

Similarly to the period T14 in the first embodiment, a period T35 is a charging time to accumulate the charge corresponding to a predetermined voltage in the main capacitor 302 of the strobe 300.

The camera 100 starts the operation for changing the operation state of the camera 100 from the power saving state to the start-up state based on the calculated start-up timing at a timing T36. The charge of the main capacitor 302 may be completed before the start of the operation. Alternatively, the charge may be completed with the pre-image-capture preparation in the camera 100.

When the accumulation of charge (corresponding to a predetermined voltage) in the main capacitor 302 and the pre-image-capture preparation in the camera 100 are completed, the CPU 109 causes the image capturing unit to capture an image of the object in synchronization with the light emission of the strobe 300 at a timing T37.

As described above, the camera 100 of the present embodiment maintains the operation state of the camera 100 in the power saving state until the start of the pre-image-capture preparation in the camera 100 even if it is determined in the light emission determination to cause the strobe 300 to emit a light. In other words, the camera 100 of the present embodiment gets into the power saving state temporarily after the light emission determination regardless of the result from the light emission determination. Then, the camera 100 starts the operation for changing the operation state of the camera 100 from the power saving state to the start-up state for the next image capture.

The configuration described above enables the camera 100 of the present embodiment to maintain the operation state of the camera 100 in the power saving state after the light emission determination until just before the camera 100 captures an image of the object regardless of the necessity of the light emission of the strobe 300. Thus, the camera 100 of the present embodiment can curb the electric power consumption in the camera 100 when an image of the object is captured at a set time.

Modification

Figure 7:
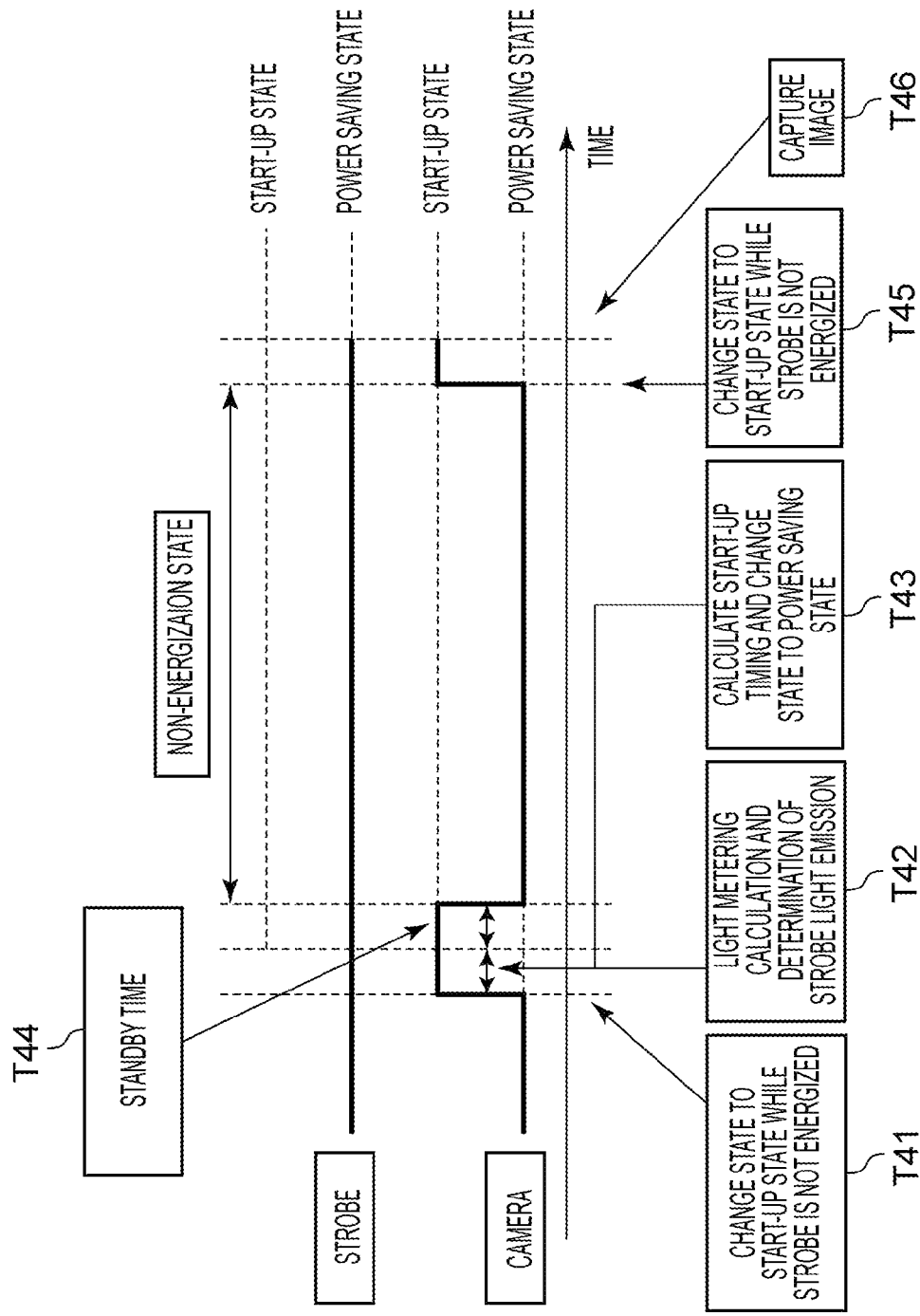
FIG. 7 is a timing diagram of each operation in the digital camera 100 that is a modification of the image capturing apparatus according to the present invention.

A modification of the embodiments of the present invention will be described with reference to FIG. 7. FIG. 7 is a timing diagram of each operation in a camera 100 that is a modification of the image capturing apparatus according to the present invention. Note that FIG. 7 illustrates an example of the case in which a CPU 109 determines in a light emission determination not to cause a strobe 300 to emit a light. The same processes as the processes at the timings T21 to T23 in the first embodiment are performed at timings T41 to T43 illustrated in FIG. 7. The same processes as the processes at the timings T24 and T25 in the first embodiment are performed at timings T45 and T46.

In the present modification, a configuration to start the operation for changing the operation state of the camera 100 to the power saving state after a predetermined time has elapsed since the strobe light emission determination will be described. The details will be described below.

As illustrated in FIG. 7, a standby time (first time) T44 is set after the light metering operation and the determination of light emission of the strobe 300 in the present modification. In the present embodiment, a period from the completion of the light emission determination with the CPU 109 to a predetermined time is set as the standby time T44.

The user can set the predetermined time arbitrarily. Alternatively, the default of time stored in the memory 105 in advance may be set as the predetermined time. The standby time T44 may start at any timing as long as the timing is in a period from the light emission determination to the start of the pre-image-capture preparation.

A built-in timer 115 measures the time until the standby time (first time) T44 elapses. Then, the CPU 109 determines whether the built-in timer 115 has completed the measurement of the time. When the CPU 109 determines that the standby time T44 has elapsed, the CPU 109 starts the operation for changing the operation state of the camera 100 from the start-up state to the power saving state.

Herein, the camera 100 of the present modification is configured to display predetermined information on a display unit 107 in the camera 100 in the standby time T44. Any information may be displayed as the predetermined information. However, the contents of the result from the determination of the light emission of the strobe 300 with the CPU 109 are preferably displayed. In other words, the information about the result form the light emission determination is noticed through the display unit 107 at the standby time T44.

When the necessity of light emission of the strobe 300, which is noticed through the display unit 107, is not the result that the user intends, the user can reset the necessity of light emission of the strobe 300 by an arbitrary operation.

The configuration described above enables the user to confirm the result from the light emission determination (the necessity of light emission) in the period from image capture to the next image capture in the interval image sensing mode. The user can also set the necessity of light emission of the strobe 300 again in the period until the next image capture if the result from the determination is different from the user's intention. This configuration can prevent the strobe 300 from emitting a light or from not emitting a light against the user's intention in the interval image sensing.

The preferred embodiments (and modification) of the present invention have been described above. However, the present invention is not limited to the embodiments and modification, and can variously be transformed or changed in the scope of the gist of the invention. For example, the embodiment is configured to acquire a plurality of still images captured based on predetermined intervals in the interval image sensing mode. However, the acquisition of the images is not limited to the embodiment. For example, a movie may be acquired at each image capture in the interval image sensing. Specifically, capturing the images of the object sequentially based on preset time intervals can obtain a plurality of movies captured based on predetermined time intervals.

The CPU 109 can generate a time-lapse movie by connecting a plurality of pieces of image data acquired in the interval image sensing mode. Note that such a time-lapse movie may be generated by the connection of a plurality of movies described above.

The processing unit or control unit provided in the camera 100 controls the operation of the camera 100 (including the strobe 300) and the lens unit 200 in the embodiments. However, the control is not limited to the embodiments. Programs in accordance with the flowcharts illustrated in FIGS. 2 and 5 may be stored in the memory 105 in advance such that a predetermined control unit or the CPU executes the program. The execution can control the operation of the camera 100 or the lens unit 200.

The programs may have any formats, such as a program to be executed with an object code, or interpreter, or script data to be provided to the OS, as long as the programs each have the function for controlling the operation of the camera 100 or the lens unit 200. The recording medium for providing the programs may be, for example, a magnetic recording medium such as a hard disk or a magnetic tape, or an optical/magneto optical recording medium.

A digital camera is used as an example of the image capturing apparatus of the present invention in the embodiments. However, the present invention is not limited to the digital camera. The present invention can be used for various image capturing apparatuses, for example, a portable device such as a digital video camera, or a smartphone in the scope of the gist of the present invention.

A camera system configured to generally perform each operation in the digital camera and the light emission unit may be used in the embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-093088, filed Apr. 28, 2014, which is hereby incorporated by reference herein in its entirety.

What is claimed is:

1. An image capturing apparatus that includes an image capturing unit and captures an image of an object based on a set time, the image capturing apparatus comprising:
   a first state-changing unit that can change a state of a light emission unit to a first state in which the light emission unit emits a light corresponding to the image capturing unit capturing an image of an object, and to a second state in which electric power consumption decreases in comparison with consumption in the first state;
   a second state-changing unit that can change an operation state of the image capturing apparatus to a third state in which the image capturing unit captures an image of an object, and to a fourth state in which electric power consumption decreases in comparison with consumption in the third state; and
   a light emission determining unit configured to determine whether to cause the light emission unit to emit a light for a next image capture with the image capturing unit,
   wherein the first state-changing unit maintains the state of the light emission unit in the second state until the next image capture when the state of the light emission unit is in the second state and the light emission determining unit determines not to cause the light emission unit to emit a light, and
   wherein the second state-changing unit starts an operation for changing the operation state of the image capturing apparatus from the third state to the fourth state after a determination with the light emission determining unit when the operation state of the image capturing apparatus is in the third state and the light emission determining unit determines not to cause the light emission unit to emit a light, and then the second state-changing unit starts an operation for changing the operation state of the image capturing apparatus from the fourth state to the third state for the next image capture.

2. The image capturing apparatus according to claim 1, wherein the set time is a set time interval,
   wherein the image capturing apparatus captures images of an object sequentially based on the set time intervals, and wherein the light emission determining unit determines, in a period between image capture and the next image capture with the image capturing unit, whether to cause the light emission unit to emit a light at the next image capture with the image capturing unit.

3. The image capturing apparatus according to claim 2, Wherein the second state-changing unit maintains the operation state of the image capturing apparatus in the third state until the next image capture without changing the operation state of the image capturing apparatus from the third state to the fourth state after image capture with the image capturing unit when the set time interval is shorter than a predetermined time.

4. The image capturing apparatus according to claim 1, wherein the first state-changing unit starts an operation for changing the state of the light emission unit from the second state to the first state before the next image capture when the state of the light emission unit is in the second state and the light emission determining unit determines to cause the light emission unit to emit a light.

5. The image capturing apparatus according to claim 4, wherein, when the state of the light emission unit is in the second state and the light emission determining unit determines to cause the light emission unit to emit a light, the second state-changing unit starts an operation for changing the operation state of the image capturing apparatus from the third state to the fourth state after the first state-changing unit starts an operation for changing the state of the light emission unit from the second state to the first state, and then the second state-changing unit maintains the operation state of the image capturing apparatus in the fourth state until a preparation for the next image capture starts.

6. The image capturing apparatus according to claim 1, further comprising:
a light metering unit configured to meter luminance of the object,
wherein the light emission determining unit determines whether to cause the light emission unit to emit a light based on information about the luminance of the object metered with the light metering unit.

7. The image capturing apparatus according to claim 1, further comprising:
a distance acquisition unit configured to acquire information about a distance to the object,
wherein the light emission determining unit determines whether to cause the light emission unit to emit a light based on the information about a distance to the object acquired with the distance acquisition unit.

8. The image capturing apparatus according to claim 1, further comprising:
a scene determining unit configured to determine a scene when an image of the object is captured,
wherein the light emission determining unit determines whether to cause the light emission unit to emit a light based on a result from the determination with the scene determining unit.

9. The image capturing apparatus according to claim 1, wherein the second state is a state in which a capacitor connected to the light emission unit is not charged, and
wherein the fourth state is a state in which the image capturing unit does not capture an image and the light emission determining unit does not perform an operation for a light emission determination.

10. The image capturing apparatus according to claim 1, further comprising:
a notice unit configured to notice information about a result from a determination with the light emission determining unit,
wherein, when the state of the light emission unit is in the second state and the light emission determining unit determines to cause the light emission unit to emit a light, the second state-changing unit starts an operation for changing the operation state of the image capturing apparatus from the third state to the fourth state after a first time has elapsed since the determination with the light emission determining unit, and
wherein, when the state of the light emission unit is in the second state and the light emission determining unit determines to cause the light emission unit to emit a light, the notice unit notices the information about a result from the determination with the light emission determining unit in the first time.

11. An image capturing apparatus that captures an image of an object based on a set time, the image capturing apparatus comprising:
an image capturing unit;
a first state-changing unit that can change a state of an light emission unit;
a second state-changing unit that can change an operation state of the image capturing apparatus to a first state in which the image capturing unit captures an image of an object, and to a second state in which electric power consumption decreases in comparison with consumption in the first state; and
a light emission determining unit configured to determine, by a next image capture with the image capturing unit, whether to cause the light emission unit to emit a light for the next image capture,
wherein the first state-changing unit changes the state of the light emission unit based on a result from the determination with the light emission determining unit, and
wherein the second state-changing unit starts an operation for changing the operation state of the image capturing apparatus from the first state to the second state after the determination with the light emission determining unit, and then the second state-changing unit starts an operation for changing the operation state of the image capturing apparatus from the second state to the first state for the next image capture.

12. The image capturing apparatus according to claim 11, wherein the set time is a set time interval,
wherein the image capturing apparatus captures images of the object sequentially based on the set time intervals, and
wherein the light emission determining unit determines, in a period between image capture and the next image capture with the image capturing unit, whether to cause the light emission unit to emit a light at the next image capture with the image capturing unit.

13. The image capturing apparatus according to claim 11, wherein the first state-changing unit changes the state of the light emission unit to a third state in which the light emission unit emits a light corresponding to the image capturing unit capturing an image of an object, and to a fourth state in which electric power consumption decreases in comparison with consumption in the third state,
wherein the first state-changing unit maintains the state of the light emission unit in the fourth state until the next image capture when the state of the light emission unit is in the fourth state and the light emission determining unit determines not to cause the light emission unit to emit a light, and wherein the first state-changing unit starts an operation for changing the state of the light emission unit from the fourth state to the third state before the next image capture when the state of the light emission unit is in the fourth state and the light emission determining unit determines to cause the light emission unit to emit a light.

14. The image capturing apparatus according to claim 13, wherein the second state-changing unit maintains the operation state of the image capturing apparatus in the second state until the next image capture without changing the operation state of the image capturing apparatus from the first state to the second state after image capture with the image capturing unit when the set time interval is shorter than a predetermined time.

15. The image capturing apparatus according to claim 11, wherein the second state is a state in which the image capturing unit does not capture an image and the light emission determining unit does not perform an operation for a light emission determination.

16. The image capturing apparatus according to claim 11, further comprising:
    a notice unit configured to notice information about a result from a determination with the light emission determining unit,
    wherein, when the light emission determining unit determines to cause the light emission unit to emit a light, the second state-changing unit starts an operation for changing the operation state of the image capturing apparatus from the first state to the second state after a first time has elapsed since the determination with the light emission determining unit, and
    wherein, when the light emission determining unit determines to cause the light emission unit to emit a light, the notice unit notices the information about a result from the determination with the light emission determining unit in the first time.

17. A method for controlling an image capturing apparatus that includes an image capturing unit and captures an image of an object based on a set time, the method comprising:
    (a) changing a state of an light emission unit to a first state in which the light emission unit emits a light corresponding to the image capturing unit capturing an image of an object, and to a second state in which electric power consumption decreases in comparison with consumption in the first state;
    (b) changing an operation state of the image capturing apparatus to a third state in which the image capturing unit captures an image of an object, and to a fourth state in which electric power consumption decreases in comparison with consumption in the third state; and
    (c) determining, by a next image capture with the image capturing unit, whether to cause the light emission unit to emit a light at the next image,
    wherein, in step (a), the state of the light emission unit is maintained in the second state until the next image capture when the state of the light emission unit is in the second state and it is determined not to cause the light emission unit to emit a light in step (c), and
    wherein, in step (b), an operation for changing the operation state of the image capturing apparatus from the third state to the fourth state is started after the determination in step (c) when the operation state of the image capturing apparatus is in the third state and it is determined not to cause the light emission unit to emit a light in step (c), and then an operation for changing the operation state of the image capturing apparatus from the fourth state to the third state is started for the next image capture.

18. A method for controlling an image capturing apparatus that includes an image capturing unit and captures an image of an object based on a set time, the method comprising:
    (a) changing a state of an light emission unit;
    (b) changing an operation state of the image capturing apparatus to a first state in which the image capturing unit captures an image of an object, and to a second state in which electric power consumption decreases in comparison with consumption in the first state; and
    (c) determining, by a next image capture with the image capturing unit, whether to cause the light emission unit to emit a light at the next image,
    wherein, in step (a), the state of the light emission unit is changed based on a result from the determination in step (c), and
    wherein, in step (b), an operation for changing the operation state of the image capturing apparatus from the first state to the second state is started after the determination in step (c), and then an operation for changing the operation state of the image capturing apparatus from the second state to the first state is started for the next image capture.

* * * * *